Dec. 9, 1930.  E. STAUVERMAN  1,784,163
WEED CUTTER
Filed Dec. 21, 1928
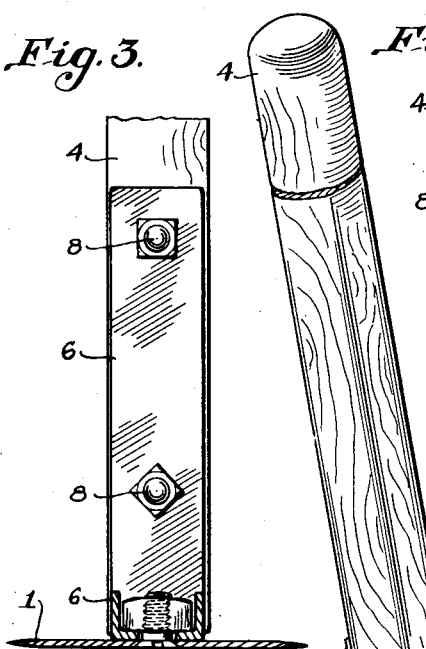
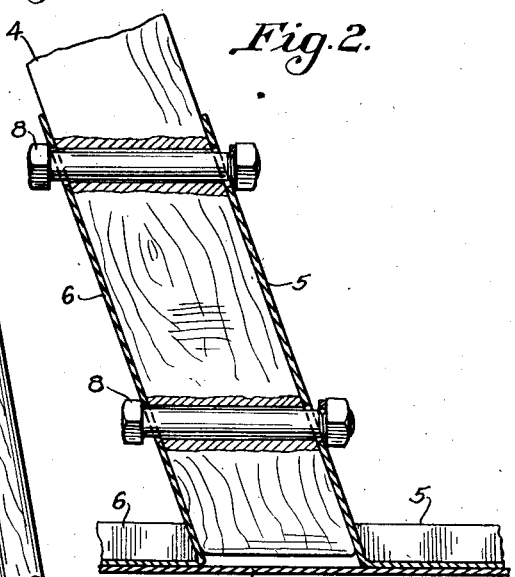
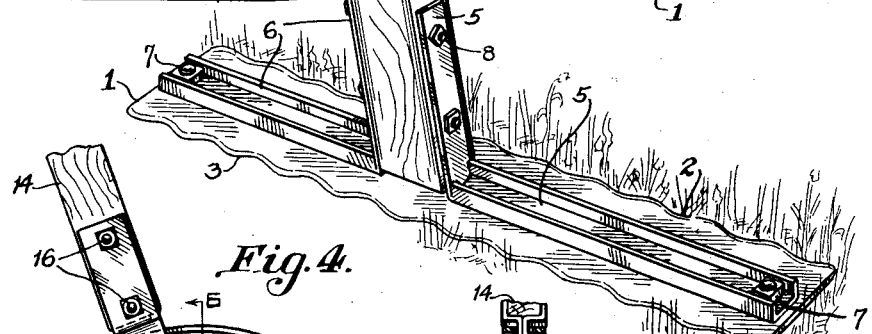
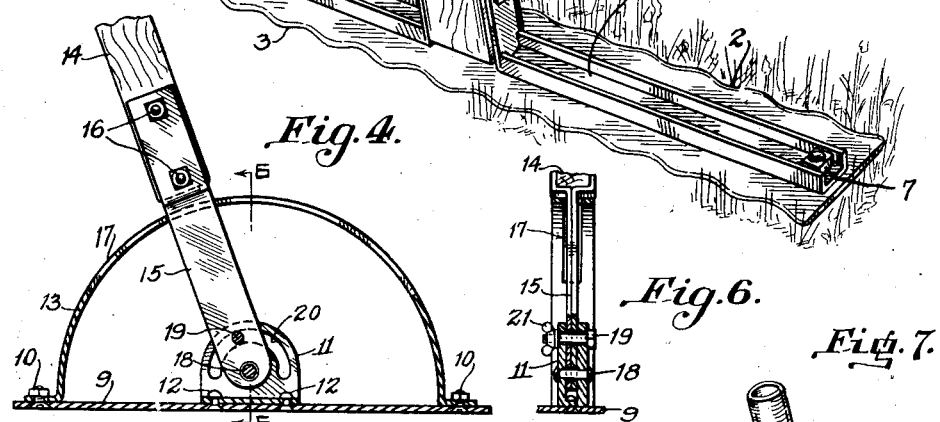
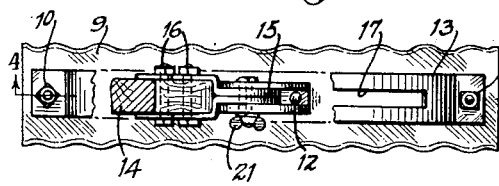
Inventor
*Edward Stauverman*
By *Mason Fenwick & Lawrence*
Attorneys Patented Dec. 9, 1930

1,784,163

UNITED STATES PATENT OFFICE

EDWARD STAUVERMAN, OF LAKELAND, FLORIDA

WEED CUTTER

Application filed December 21, 1928. Serial No. 327,684.

This invention relates to improvements in weed cutters having a blade connected therewith which will pass through the weeds or grass with practically no interference except that resulting from the handle of the device, which is connected with the blade at an angle for permitting the operator to stand in a natural erect position and operate the device with a swinging stroke, the blade having a wavelike cutting edge in order to strike the weeds and grass at an angle.

A further object of this invention is to provide a weed cutter extremely simple and inexpensive of manufacture, primarily of use in the mowing down of weeds, grass, light brush and the like, consisting substantially of a blade having its cutting edges in wavelike formation, the handle being angularly attached to the blade depending upon the size of the operator, the device being adjusted so that the operator may stand in a natural erect position when giving a swinging stroke to the weed cutter.

Other objects of this invention will appear from the following detailed description of the device and as disclosed in the single sheet of drawings which is herewith made a part of this application.

In the drawings—

Figure 1 illustrates a perspective view of the weed cutter disclosing the blade and handle in operative relationship.

Figure 2 represents a vertical sectional view of the weed cutter disclosing the means for connecting the handle and blade member together.

Figure 3 illustrates an end view of Figure 2.

Figure 4 represents a side elevational sectional view of a modification of this invention, taken along line 4—4 of Figure 5, disclosing a means for adjustably and angularly positioning the handle in relationship to the blade.

Figure 5 illustrates a top plan view of Figure 4.

Figure 6 represents a sectional view of Figure 4 taken along line 6—6.

Figure 7 illustrates a perspective view of a modified form of socket for receiving the handle.

As one modification of this invention it is preferred that numeral 1 designate a cutting blade, made of any suitable material such as sheet steel, the cutting edges 2 and 3 having a wavelike formation so that in swinging the weed cutter the wavelike edges of the blade will meet the weeds or grass at an angle.

A handle portion 4, made of suitable material, is adapted to be angularly attached to the blade 1 at an angle to permit the operator of the weed cutter to stand in a natural erect position when giving a swinging stroke to the device, and means for attaching the handle 4 to the blade, consisting of bracket members 5 and 6, are formed in such a manner that they will in addition to firmly connecting the handle 4 and blade 1 together, act as a reenforcement for the blade 1 and aid materially in enabling the cutting blade to withstand the hard usage incidental to weed cutters. The bracket members 5 and 6 are firmly attached to the blade 1 by means of machine bolts 7 and the like, and fastened securely to the handle 4 by means of bolts 8, extending through the handle and bracket portions.

Figures 4, 5, and 6 illustrate a modification of this invention wherein the weed cutter consists of a blade member 9, formed as above described and adapted to be securely attached by means of machine bolts 10, bracket portion 11, and rivets 12, or other suitable fastening means, to a guiding bracket 13 and handle member 14.

A yoke element 15, made of any proper material such as wrought iron, is adapted to be securely fastened to the handle member 14 by means of bolts 16, the yoke element 15 being allowed to extend in slidable relationship through a slot 17 in the bracket 13, the lower end of the yoke 15 being pivotally mounted as at 18 in the bracket 11. A threaded pin 19 extends through the yoke element 15 and bracket 11, and is adapted to be slidably positioned within a slot 20 of the bracket 11 in such a manner that the handle portion 14 may be adjustably positioned at a desired angle with the blade 9, and held firmly in that position by means of a thumb nut 21 in operative relationship with the pin number 19, the lower end of the yoke element 15 being held thereby firmly in clamped relationship within the bracket member 11.

A modified bracket is illustrated in Figure 7 in which a handle socket 6' is provided with oppositely disposed flanges 5' for attachment to the cutting blade.

In operation this invention provides a weed cutter simple and inexpensive of manufacture, which may be easily handled and operated by persons of various sizes with equal comfort and efficiency, for the reason that the handle may be angularly arranged and positioned in relationship to the blade.

The cutting edge of the blade, according to this invention, is formed having a wavelike construction, thereby making it possible to give an efficient angular stroke to the grass or weeds on every swing of the cutter. A prime object accruing from the structure of the weed cutter, according to this invention, lies in the fact that the blade member is positioned at right angles to the plane of adjustability of the handle.

It will be undertsood that many changes and modifications may be made in the form of embodiment of the invention within the scope of the following claims without departing from the spirit thereof.

What I claim is:

1. In a weed cutter, a blade member having oppositely disposed wavelike cutting edges, a handle element angularly mounted on the blade intermediate its ends, bracket members for securely holding the handle in fixed relationship to the blade, one portion of the bracket members extending upwardly along the handle element, another portion of the bracket members extending along the upper surface of the blade, substantially to the ends thereof, the bracket portions being securely fastened to both the handle and blade in such a manner that the blade will receive reinforcement therefrom throughout its length.

2. A weed cutter comprising an elongated cutting blade having its long edges sharpened, a handle secured by one end in abutment with one face of the blade substantially medial thereof, and brackets of channel cross section formed by a base and side flanges, secured to the face of the blade and extending lengthwise thereof, parts of the side flanges of the brackets being cut away and the base of that part upturned and secured to the handle in abutment with the ends of the side flanges whereby said blade is reinforced both with respect to the handle and against flexing.

In testimony whereof I affix my signature.

EDWARD STAUVERMAN.